M. W. NEEDHAM.
SOFT RUBBER TIRE FILLER.
APPLICATION FILED DEC. 22, 1920.

1,421,537.

Patented July 4, 1922.

Inventor
Moses W. Needham
By Jerry A. Mathews
Lester L. Sargent
Attorneys

UNITED STATES PATENT OFFICE.

MOSES W. NEEDHAM, OF WACO, TEXAS.

SOFT-RUBBER TIRE FILLER.

1,421,537.  Specification of Letters Patent.  Patented July 4, 1922.

Application filed December 22, 1920. Serial No. 432,461.

*To all whom it may concern:*

Be it known that I, MOSES W. NEEDHAM, a citizen of the United States, residing at Waco, in the county of McLennan and State of Texas, have invented a new and useful Soft-Rubber Tire Filler, of which the following is a specification.

The object of my invention is to provide certain improvements in the rubber tire filler and method of making same, covered by my Patent No. 1,339,472, whereby a more flexible, a more durable, and a better fitting tire filler can be manufactured. I attain the objects of my invention by the device illustrated in the accompanying drawings, in which—

Figure 1:
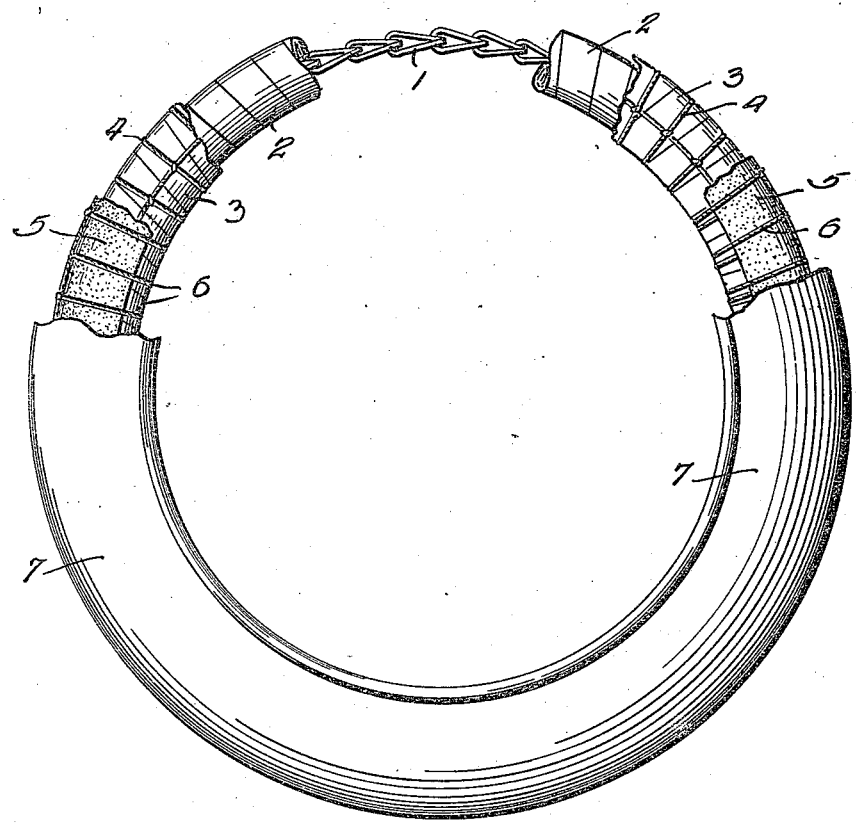
Figure 2:
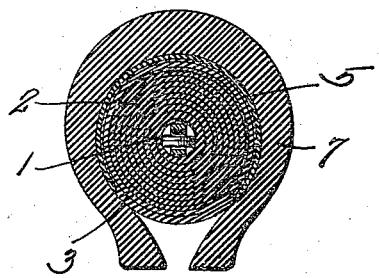

Figure 1 is a side elevation of a tire casing containing my filler, successive parts of which are broken away to show how it is made; and Fig. 2 is a transverse section through such a tire casing and filler.

Like numerals designate like parts in each of the several views.

My method of making the rubber tire filler illustrated consists in forming a complete ring of a suitable chain 1, which serves as the reinforcing core; then wrapping strips of soft rubber in a suitable manner, preferably spirally, around the chain; then wrapping a second layer 3 of strips of soft rubber, preferably spirally, and with the spirals arranged in reverse disposition from the direction of wrapping of the innermost layer 2, tying said filler together with cords 4; then applying an outer shell of soft rubber 5 such as that from a split inner tube, and securing same by suitable cords 6. The purpose of the cord is merely to hold the outermost strip 5 in place until the filler has been inserted in the outer casing. After a period of use the strip 5 will adhere to the rest of the filler. The chain 1 constitutes a substantial improvement over the reinforcing element disclosed in my former patent in that it has a greater degree of flexibility, never breaks, and can be had at low cost. By wrapping the successive layers 2 and 3 in reverse directions a more even and well rounded filler is obtained. By providing the new outer strip 5 the device is readily shaped to fit and fill different casings where the inside chamber of same varies. Member 1 may be any suitable jointed or chain cable, but I prefer to employ the particular form of chain illustrated.

In applying the new filler it is forced into the casing with suitable tools, and its flexibility makes its operation relatively easy. It doubles the tire mileage in a new casing and saves the inner tubes, as has been disclosed by extensive use of this filler in place of air in various types of cars. It is required that flexible soft rubber be used in strip form, as such materials as cork are inefficient by reason of a tendency to absorb moisture, flatten, and lose resiliency. It is also required that the rubber be wound substantially as described, to afford the most efficient tire filler.

What I claim is:—

1. In a reinforced soft rubber tire filler, the combination of a chain forming a complete ring, a layer formed of strips of rubber, said strips being disposed in reverse direction, an outer strip of soft rubber, and means for securing the strips against unravelling, for the purpose described.

2. In a reinforced soft rubber tire filler, the combination of a chain forming a complete ring, a layer of soft rubber strips wound about said chain, a second layer of soft rubber strips wound about the first layer, a tread strip, and means for preventing the aforesaid strips from unravelling.

MOSES W. NEEDHAM.